United States Patent [19]

Jackson

[11] Patent Number: 5,274,215
[45] Date of Patent: Dec. 28, 1993

[54] PORTABLE ELECTRIC FOOD WARMING APPARATUS HAVING A REMOVABLE TRAY INSERT

[76] Inventor: Emily R. Jackson, 3812 Puddledock Rd. TR20, Prince George, Va. 23875

[21] Appl. No.: 970,922

[22] Filed: Nov. 2, 1992

[51] Int. Cl.$^5$ .................. H05B 3/00; A47J 27/00
[52] U.S. Cl. .................. 219/439; 219/202; 219/387; 219/433; 219/506; 219/521; 392/444
[58] Field of Search .................. 219/429–442, 219/506, 521, 202, 385–387; 392/444–447

[56] References Cited

U.S. PATENT DOCUMENTS

| | | | |
|---|---|---|---|
| 1,961,756 | 6/1934 | French | 219/439 X |
| 2,817,744 | 12/1957 | Free | 219/439 |
| 2,994,761 | 8/1961 | Hart et al. | 219/433 X |
| 3,038,058 | 6/1962 | Gordon | 219/439 X |
| 3,678,248 | 7/1972 | Tricault et al. | 219/387 X |
| 3,805,018 | 4/1974 | Luong et al. | 219/387 |
| 4,009,368 | 2/1977 | Faivre et al. | 219/430 |
| 4,134,004 | 1/1979 | Anderson et al. | 219/202 X |
| 4,198,559 | 4/1980 | Walter et al. | 219/387 |
| 5,045,672 | 9/1991 | Scott | 219/439 |
| 5,117,090 | 5/1992 | Askins | 219/506 |

*Primary Examiner*—Anthony Bartis
*Attorney, Agent, or Firm*—Leon Gilden

[57] ABSTRACT

A portable food warming apparatus has a base container removably receiving a tray insert having a tray floor spaced from the base container floor to define a chamber therebetween filled with a heat exchange liquid. An electric resistance heating element coil is mounted on the container floor to effect warming of the liquid and thereby the tray insert. A vehicular cigarette lighter adapter plug permits energization of the heating element coil at remote locations. The base container includes a rotatable locking member for releasable locking the tray insert to the base container. A light source on the base container coupled to a fiber-optic cable surrounding the periphery of the tray insert may be provided for illuminating the tray insert contents during conditions of limited light. A removable lid covers the tray insert.

2 Claims, 4 Drawing Sheets

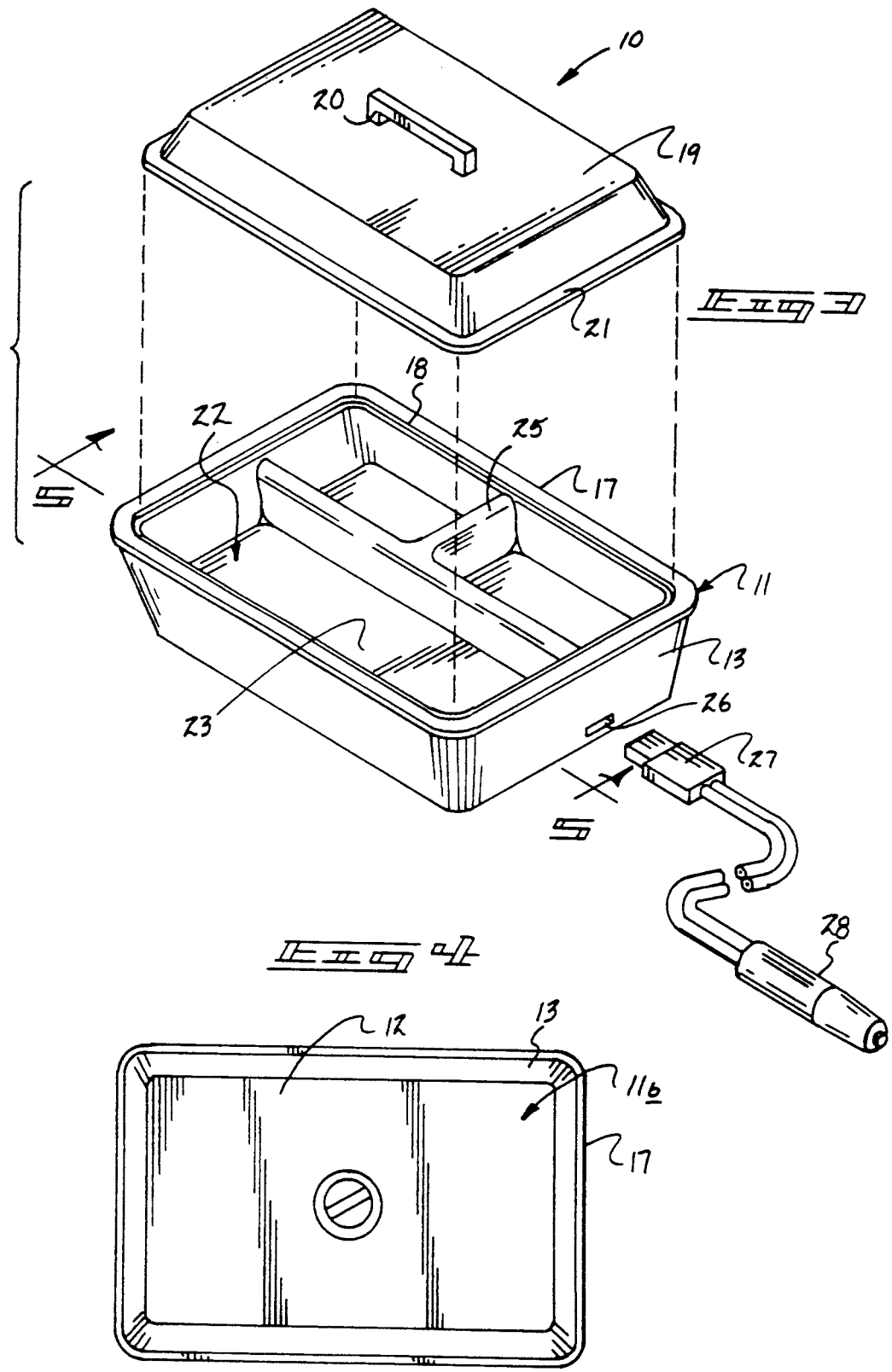

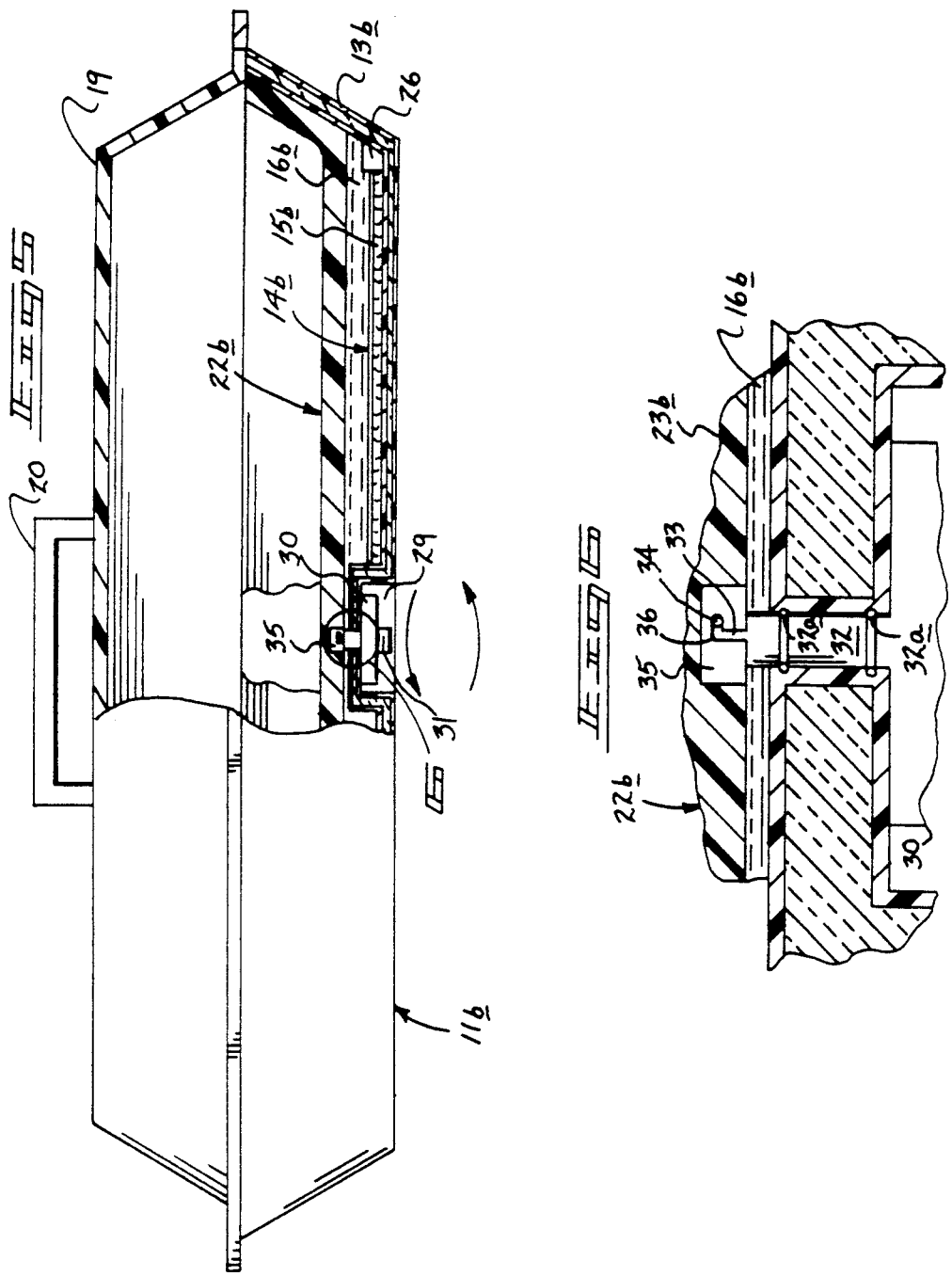

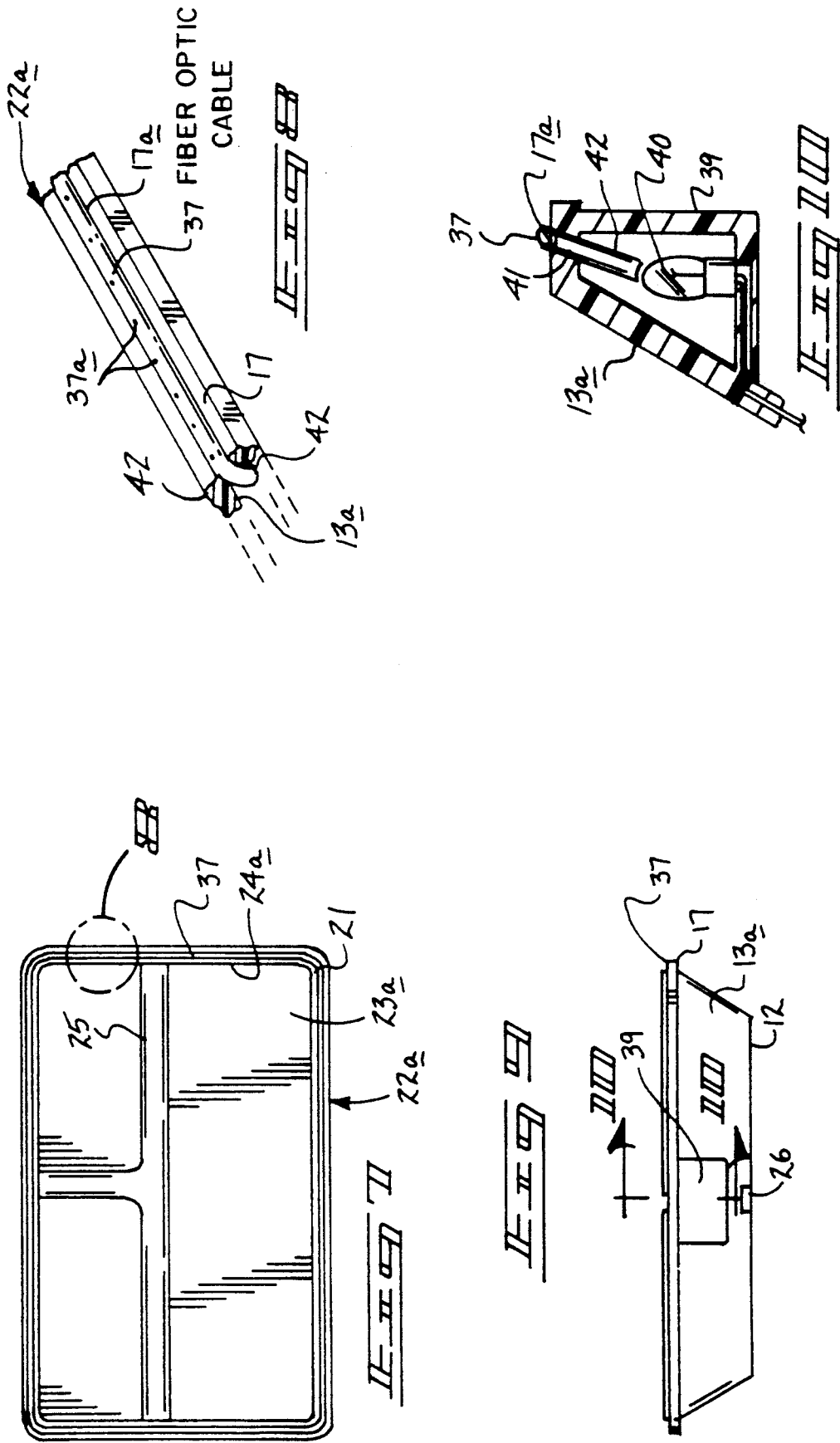

PORTABLE ELECTRIC FOOD WARMING APPARATUS HAVING A REMOVABLE TRAY INSERT

BACKGROUND OF THE INVENTION

1. Field of the Invention

The field of the invention relates to warming tray structure, and more particularly pertains to a new and improved food warming apparatus wherein the same maintains food at elevated temperatures in remote locations.

2. Description of the Prior Art

Food warming structure of various types have been utilized throughout the prior art and are typically of a structure to accommodate various structural conditions such as in U.S. Pat. 4,822,981 to Chaudoir wherein a warming device is arranged for cooperation with infrared heater structure.

The U.S. Pat. No. 4,966,296 to Farrell sets forth compartmented container structure for heating of various food components therewithin.

U.S. Pat. No. 4,803,921 and U.S. Pat. No. 4,246,884 are further examples of food warming structure.

The instant invention attempts to overcome deficiencies of the prior art by providing for a food warming structure arranged for use in remote locations, as well as a structure of compact and convenient organization and in this respect, the present invention substantially fulfills this need.

SUMMARY OF THE INVENTION

In view of the foregoing disadvantages inherent in the known types of food warming apparatus now present in the prior art, the present invention provides a food warming apparatus wherein the same is arranged to provide for removable tray insert relative to an underlying base container having an overlying lid. As such, the general purpose of the present invention, which will be described subsequently in greater detail, is to provide a new and improved food warming apparatus which has all the advantages of the prior art food warming apparatus and none of the disadvantages.

To attain this, the present invention provides a base container arranged to complementarily receive a tray insert thereon, with the tray insert having a tray floor spaced from the base container floor to position fluid therebetween. A heating element is mounted on the container floor to effect warming of the fluid, wherein a vehicular cigarette lighter adapter plug is arranged to direct current to the heating element for maintaining warming of the fluid in remote locations. The invention is arranged to further provide for optional locking of the inset relative to the container floor, as well as employing optional illumination structure for viewing of contents within the insert during conditions of limited available light.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved food warming apparatus which has all the advantages of the prior art food warming apparatus and none of the disadvantages.

It is another object of the present invention to provide a new and improved food warming apparatus which may be easily and efficiently manufactured and marketed.

It is a further object of the present invention to provide a new and improved food warming apparatus which is of a durable and reliable construction.

An even further object of the present invention is to provide a new and improved food warming apparatus which is susceptible of a low cost of manufacture with regard to both materials and labor, and which accordingly is then susceptible of low prices of sale to the consuming public, thereby making such food warming apparatus economically available to the buying public.

Still yet another object of the present invention is to provide a new and improved food warming apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention.

FIG. 4 is an orthographic bottom view of the invention.

FIG. 5 is sectional view, taken along the lines 5—5 of FIG. 3 in the direction indicated by the arrows.

FIG. 6 is an enlarged orthographic view of section 6 as set forth in FIG. 5.

FIG. 7 is sectional top view of a modified tray insert structure as employed by the invention.

FIG. 8 is an isometric illustration of section 8 as set forth in FIG. 7.

FIG. 9 is sectional end view of the tray structure as set forth in FIG. 7.

FIG. 10 is sectional view, taken along the lines 10—10 of FIG. 9 in the direction indicated by the arrows.

DESCRIPTION OF THE PREFERRED EMBODIMENT

Figure 1:
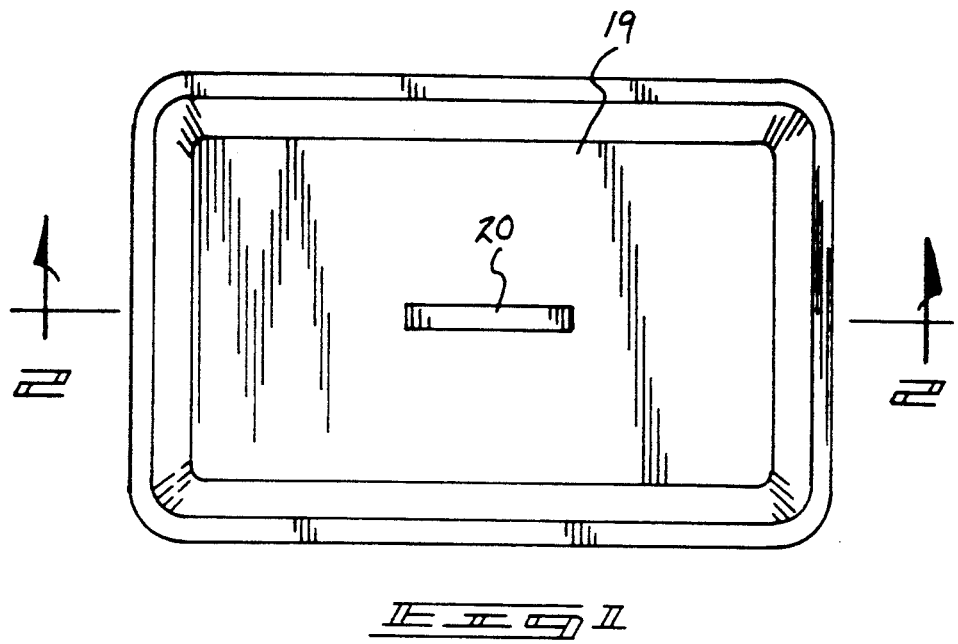
FIG. 1 is an orthographic top view of the invention.

With reference now to the drawings, and in particular to FIGS. 1 to 10 thereof, a new and improved food warming apparatus embodying the principles and concepts of the present invention and generally designated by the reference numeral 10 will be described.

More specifically, the food warming apparatus 10 of the instant invention essentially comprises a base container 11 having a container floor 12, with a continuous side wall 13 oriented at a predetermined obtuse included angle relative to the floor 12. A heating chamber 14 is mounted to the container floor 12, having an electrical resistance coil 15 contained therewithin, including an electrical socket 26 directed through the side wall for electrical communication relative to the electrical resistance coil, in a manner as indicated in FIG. 3. Fluid 16, such as water, is positioned within the container onto the heating chamber 14 between the heating chamber and a tray insert 22 defining a fluid chamber 116. For positioning of the tray insert, the side wall 13 includes a side wall flange 17 parallel to the floor 12 extending laterally beyond the container side wall 13. A lid 19 is provided, having a lid handle 20 medially thereof, wherein the lid includes a lid side wall extending downwardly relative to the lid top wall, with a lid flange 21 positioned within a continuous lid receiving channel 18 formed at an intersection of the container side wall 13 and the side wall flange 17.

The tray insert 22 includes a tray insert floor 23 spaced parallel and above the container floor 12. The tray insert further includes an insert side wall 24 oriented at said predetermined obtuse included angle relative to the insert floor 23. Positioning ribs 25 mounted to the floor, as indicated in FIG. 3 for example, partition the tray insert into various compartments for positioning various foods therein. An electrical plug structure 27 is received within the electrical socket 26 for directing electrical energy to the electrical resistance heating coil 15 and operative through a vehicular cigarette lighter plug 28, of a type for reception within a vehicular cigarette lighter, for remote warming of the water and maintaining elevated temperatures of food components positioned within the compartments of the tray insert 22.

Figure 2:
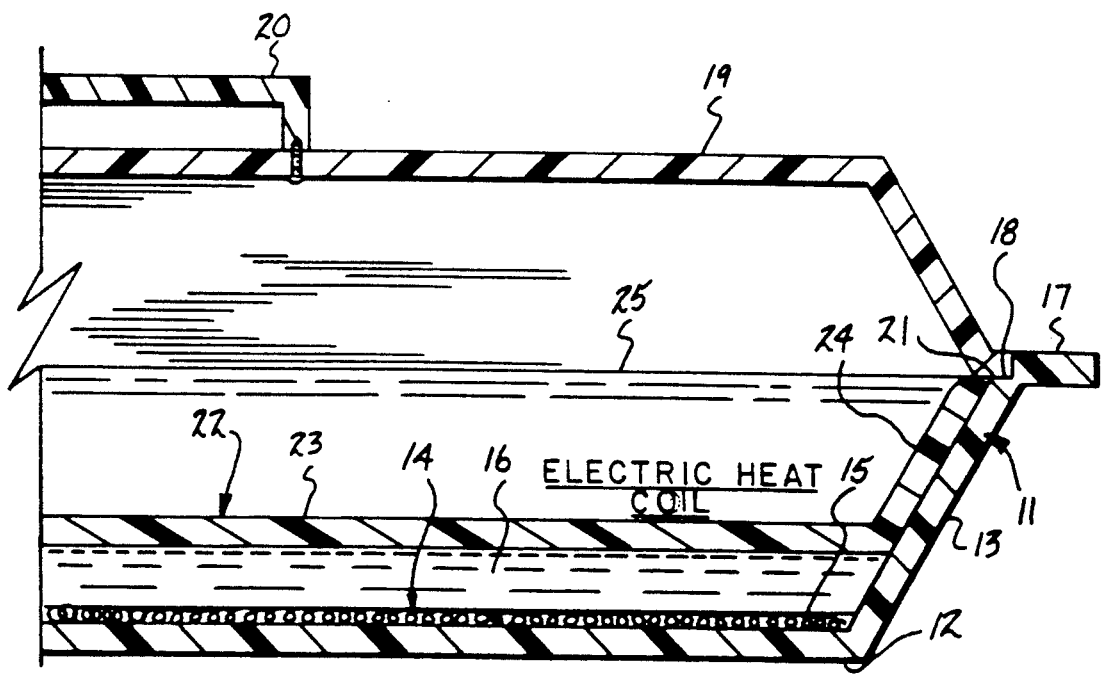
FIG. 2 is sectional view, taken along the lines 2—2 of FIG. 1 in the direction indicated by the arrows.

The FIGS. 4-6 indicates the use of a lock mechanism to lock the tray insert relative to the container floor 12. To this end a further base container and tray insert 11b and 22b respectively of a type as indicated relative to the FIGS. 1-3 are provided having a respective tray insert 22b. The tray insert 22b includes an insert floor 23b. The further base container 11b includes a respective heating chamber 14b to define a fluid chamber 116b to the insert floor 23b containing/fluid 16B. A respective heating coil 15b is oriented within the heating chamber 14b. Positioning ribs 25b are mounted to the floor 23b. To this end, a floor recess 29 is directed medially of the floor 12, in a manner as indicated in FIG. 4. A rotary plate 30 includes a handle lug 31 mounted medially thereof to permit ease of rotation of the rotary plate, with a lock shaft 32 fixedly mounted to the rotary plate coaxially thereof and sealingly directed through a container floor bore in a sealing relationship utilizing sealing rings 32a, as indicated in FIG. 6. A lock shaft 32 terminates in a lock shaft head 33 having at least one head lug 34 mounted to a cylindrical side wall of the lock shaft head 33. A cylindrical locking cup 35 is recessed within a bottom surface of the tray insert floor 23 having an L-shaped slot 36 for receiving the head lug 34, whereupon projection of the lock shaft head 33 complementarily within the locking cup 35 and rotation of the lock shaft by rotation of the handle lug 31, the head lug 34 is received within an upper leg of the L-shaped slot 36 to secure the tray insert 22 relative to the base container 11.

The FIGS. 7-10 indicate the further employment by the invention of an additional illumination structure to provide for illumination peripherally about the tray insert 22 during conditions of limited available light. To this end, a continuous groove 17a is directed into the side wall flange 17, wherein the cable groove 17a receives an associated fiber optic cable 37. The fiber optic cable 37 includes a plurality of spaced cable notches 37a directed into the cable for permitting projection of illumination from the fiber optic cable 37. An illumination housing 39 is mounted to the container side wall 13 exteriorly of the container, having an illumination bulb 40 therewithin in electrical communication with the electrical socket 26, whereupon directing of electrical current into the heating chamber 14, and more specifically the electrical resistance coil 15, simultaneous illumination of the bulb 40 is effected. The bulb 40 projects illumination into a cable leading end 42 directed into the illumination housing 39 in adjacency to the bulb 40 to direct illumination throughout the fiber optic cable and thereby permit proper indication and orientation of the apparatus during conditions of limited available light.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A food warming apparatus, comprising,
   an open top base container, the base container having a base container floor,
   a container side wall, wherein the container side wall is oriented at a predetermined obtuse included angle relative to the floor,
   a heating chamber mounted onto the container floor, with the heating chamber having an electrical resistance coil within the heating chamber, an electrical socket directed through the side wall of said container in electrical communication with the electrical resistance coil, an electrical plug, the electrical plug having a power supply cord adapted to be connected in electrical communication with a vehicular cigarette lighter, the electrical plug being plugged into the electrical socket for supplying power to the electrical resistance coil, a tray insert, the tray insert mounted in said container having a floor positioned on a spaced relation to the container floor defining a fluid chamber therebetween, said fluid chamber including a heat exchange liquid, and the insert further including an insert side wall oriented at said obtuse included angle relative to the tray insert floor, with the tray insert side walls arranged in contiguous contact with the container side wall within the container, the container further having a side wall flange oriented parallel to the container floor directed peripherally and projecting exteriorly of the container side wall, the side wall flange having a continuous lid receiving channel directed into the side wall flange at an intersection with the container side wall, a lid arranged for covering the base container, the lid having a lid side wall and a lid flange, the lid flange being received within a lid receiving channel, the lid flange being in contiguous contact with an upper distal end of the insert side wall, the container floor includes a floor recess medially of the container floor projecting into the base container between the container floor and the tray insert floor, and a rotary plate mounted within the floor recess, the rotary plate having a lock shaft fixedly and coaxially mounted to the rotary plate, and the container floor recess having a bore directed orthogonally through the container floor, with the lock shaft rotatably mounted within the bore, the lock shaft including a lock shaft head, and the tray insert floor having a cylindrical locking cup recess, with the lock shaft having a lock shaft head complementarily received within the locking cup recess, the locking cup recess including at least one L-shaped slot, and the lock shaft head having a head lug, the head lug received within the L-shaped slot by rotation of the lock shaft in the locking cup recess permitting locking of the lock shaft head within the locking cup recess.

2. An apparatus as set forth in claim 1 wherein the container side wall flange includes a cable groove, the cable groove extending around the entire perimeter of flange and having a fiber optic cable mounted continuously within the cable groove, with the fiber optic cable including a fiber optic cable leading end, and an illumination housing mounted to the container side wall exteriorly of the container side wall, and the illumination housing having an illumination bulb therewithin, and the cable leading end directed into the illumination housing in adjacency to the illumination bulb, the illumination bulb arranged for electrical communication with the electrical socket permitting simultaneous illumination of the illumination bulb upon directing electrical current to the electrical resistance coil, and the fiber optic cable having a plurality of spaced cable notches within the cable for directing illumination onto the tray insert.

* * * * *